United States Patent
Han et al.

(10) Patent No.: US 12,264,582 B2
(45) Date of Patent: Apr. 1, 2025

(54) IN-SITU STRESS MEASUREMENT DEVICE AND METHOD FOR ULTRA-DEEP NON-VERTICAL DRILLING

(71) Applicant: Changjing River Scientific Research Institute, Wuhan (CN)

(72) Inventors: Xiaoyu Han, Wuhan (CN); Zhihong Dong, Wuhan (CN); Xiuli Ding, Wuhan (CN); Ping Fu, Wuhan (CN); Liming Zhou, Wuhan (CN); Xinhui Zhang, Wuhan (CN); Bin Wang, Wuhan (CN); Yuankun Liu, Wuhan (CN); Sheng Luo, Wuhan (CN); Chunhua Zhou, Wuhan (CN); Kai Ai, Wuhan (CN); Heng Zhang, Xiantao (CN)

(73) Assignee: Changjing River Scientific Research Institute, Wuhan (CN)

( * ) Notice: Subject to any disclaimer, the term of this patent is extended or adjusted under 35 U.S.C. 154(b) by 0 days.

(21) Appl. No.: 18/733,866

(22) Filed: Jun. 5, 2024

(65) Prior Publication Data
US 2024/0401477 A1    Dec. 5, 2024

(30) Foreign Application Priority Data
Jun. 5, 2023    (CN) .......................... 202310651443.6

(51) Int. Cl.
*E21B 49/08*    (2006.01)
*E21B 7/04*    (2006.01)

(52) U.S. Cl.
CPC ............ *E21B 49/087* (2013.01); *E21B 7/046* (2013.01)

(58) Field of Classification Search
CPC ............................... E21B 49/087; E21B 7/046
See application file for complete search history.

(56) References Cited

U.S. PATENT DOCUMENTS

| | | | | |
|---|---|---|---|---|
| 3,982,324 A | * | 9/1976 | Hutchison | E21B 47/098 33/302 |
| 6,526,818 B1 | * | 3/2003 | Head | E21B 7/128 73/152.01 |
| 2016/0160568 A1 | * | 6/2016 | Randall | E21B 7/065 175/26 |
| 2017/0138150 A1 | * | 5/2017 | Yencho | E21B 43/14 |
| 2021/0246782 A1 | * | 8/2021 | Eng | E21B 49/087 |
| 2022/0235612 A1 | * | 7/2022 | Holtzman | E21B 36/001 |

* cited by examiner

*Primary Examiner* — Shane Bomar

(57) ABSTRACT

An in-situ stress measurement device for ultra-deep non-vertical drilling adopts a technical route of single channel and bidirectional rolling of in-hole equipment, and its related functions are mainly realized by a bidirectional rolling device and a split-type axial-force-free circuit switching valve. The bidirectional rolling device can drive the in-hole equipment to move freely in a circumferential direction and back and forth, which changes sliding friction between the in-hole equipment and a hole wall into rolling friction during an in-situ stress measurement of non-vertical drilling. The split-type axial-force-free circuit switching valve provides a technical solution for a single-pipe test in the non-vertical drilling. The device greatly reduces wear of the in-hole equipment and the hole wall when the in-hole equipment is installed and withdrawn, can effectively protect markings of an impression measurement, and is suitable for high-efficiency in-situ stress measurement by a hydraulic fracturing method in the non-vertical ultra-deep drilling.

8 Claims, 4 Drawing Sheets

IN-SITU STRESS MEASUREMENT DEVICE AND METHOD FOR ULTRA-DEEP NON-VERTICAL DRILLING

TECHNICAL FIELD

The disclosure belongs to the technical field of geotechnical test, and in particular to an in-situ stress (i.e., geo-stress) measurement device and method for ultra-deep non-vertical drilling.

BACKGROUND

A hydraulic fracturing method is the most widely used measurement method in rock mass in-situ stress measurement methods, and it has always been the main measurement method for academic circles and science and technology service institutions to continuously promote technical improvement. In recent years, with the continuous progress of directional drilling technology, ultra-deep non-vertical or directional exploration drilling (i.e., exploration boring) has been carried out in water conservancy, hydropower and highway industries. The ultra-deep non-vertical exploration drilling needs in-situ stress measurement.

At present, a depth of the in-situ stress measurement by a horizontal hydraulic fracturing method is generally less than 200 meters (m), and a quantitative value test adopts a double-pipeline and double-loop method, in which one loop generally adopts a small-diameter drill pipe to correspond to a rock mass measurement section and the other loop generally adopts a high-pressure hose to correspond to a packer. When the two loops are put into a drilled hole, the high-pressure hose is usually wound and fixed on the drill pipe. The above measurement technology has the following defects.

1. Installation and withdrawal of in-hole equipment such as a double plug packer and an impression machine are completed by dragging the in-hole equipment manually or mechanically, and the in-hole equipment slides and rubs against a hole wall, which are easy to be damaged during the ultra-deep drilling test.

2. Markings obtained from the impression test are prone to be erased or blurred during the withdrawal process due to the friction of the hole wall, leading to test failure.

3. Compared to a single pipeline method, the equipment for the double pipeline measurement has more high-pressure hoses, and the installation and withdrawal process is complicated.

4. The high-pressure hose is tied to the drill pipe, and a worn binding tape can easily lead to unreliable binding, which can easily cause equipment damage.

SUMMARY

Based on the requirement of in-situ stress measurement for ultra-deep non-vertical drilling and the measurement deficiency of current double-pipeline methods, the disclosure provides an in-situ stress measurement device and method suitable for ultra-deep non-vertical drilling, which adopts a split-type axial-force-free circuit switching valve, a bidirectional rolling device and other main components to solve the problem that the single-pipeline test of non-vertical drilling cannot be seated due to axial force and the problem that equipment with sliding friction in the ultra-deep drilling is seriously worn. The disclosure realizes the in-situ stress measurement of the single-pipeline hydraulic fracturing method in the non-vertical ultra-deep drilling, changing the sliding friction between the in-hole equipment and the hole wall into rolling friction during the in-situ stress measurement for the non-vertical drilling can greatly reduce the wear of the in-hole equipment and the hole wall during installation and withdrawal of the in-hole equipment, especially for the ultra-deep drilling, which can effectively protect markings of the impression test.

An in-situ stress measurement device for ultra-deep non-vertical drilling, includes: ground test equipment, a high-pressure pipeline (i.e., pipeline), and in-hole equipment; and the ground test equipment is configured to provide water required for test to the in-hole equipment through the high-pressure pipeline.

The in-hole equipment includes: a bidirectional rolling device, a split-type axial-force-free circuit switching valve, a packer and an impression machine; the bidirectional rolling device is detachably connected with the high-pressure pipeline, and axial movement (i.e., axial sliding) and circumferential rotation of the bidirectional rolling device relative to a drilled hole are rolling friction.

The packer includes: an upper packer, a fracture section steel pipe and a lower packer which are sequentially detachably connected in that order, and the fracture section steel pipe defines a water outlet.

The split-type axial-force-free circuit switching valve defines a first waterway channel and a second waterway channel; the split-type axial-force-free circuit switching valve is capable of switching between a first state and a second state under a driving action of the high-pressure pipeline; in the first state, an internal waterway of the split-type axial-force-free circuit switching valve is connected with the upper packer and the lower packer through the first waterway channel to form a double-packer structure; and in the second state, the internal waterway of the split-type axial-force-free circuit switching valve is connected with the water outlet of the fracture section steel pipe through the second waterway channel and a central rod of the upper packer.

The in-hole equipment is configured to use the bidirectional rolling device, the split-type axial-force-free circuit switching valve, and the packer which are sequentially connected in that order in a quantitative value test, and use the bidirectional rolling device and the impression machine which are sequentially connected in that order in an impression test.

In an embodiment, the bidirectional rolling device is in threaded connection with the high-pressure pipeline; and the upper packer, the fracture section steel pipe and the lower packer are sequentially in threaded connection in that order.

In an embodiment, the bidirectional rolling device includes: a central shaft, an outer ring, drum-shaped balls, a retaining ring, a support frame and rollers; the central shaft defines a waterway channel therein; a top and a bottom of the central shaft are threadedly connected with the high-pressure pipeline and the split-type axial-force-free circuit switching valve, respectively; an outer side of the central shaft is provided with the support frame, the support frame is provided with the rollers thereon, and the support frame and the rollers form an inner ring of a bearing structure; an outer side of the inner ring is provided with the outer ring, and an outer surface of the outer ring is provided with the drum-shaped balls thereon; the retaining ring is provided at two sides of the inner and outer rings along an axial direction to limit the inner and outer rings; and the axial sliding in the drilled hole is borne by the drum-shaped balls, and the circumferential rotation in the drilled hole is borne by a relative movement of the inner and outer rings.

In an embodiment, the split-type axial-force-free circuit switching valve includes: a valve shaft, a limit nut, a first valve body, a second valve body, sealing rings, the first waterway channel, and the second waterway channel; the second valve body is in threaded connection with the first valve body, and three groups of sealing rings are disposed in the second valve body; two waterways are defined among the three groups of sealing rings, one of the two waterways is defined between two adjacent groups of sealing rings, and the other waterway is defined between other two adjacent groups of sealing rings; the one waterway is connected with the first waterway channel, and the other waterway is connected with the second waterway channel; and when the valve shaft slides in the second valve body driven by the high-pressure pipeline, an internal waterway of the valve shaft and the two waterways are in a connected state or a disconnected state, thereby achieving connection with the first waterway channel or the second waterway channel.

In an embodiment, the second valve body defines a drain hole configured to connect an inside and an outside of the second valve body and eliminate a cavity pressure of the second valve body when the valve shaft changes from the second state to the first state.

In an embodiment, a pressure partition is provided in the second valve body, the pressure partition is configured to isolate connection between the second waterway channel and the valve shaft, so as to eliminate a pressure of the second waterway channel on a bottom of the valve shaft during test (i.e., the impression test).

In an embodiment, the ground test equipment includes: a hydro pump, a pipeline stop valve, a pressure gauge, a data monitoring and collecting instrument, a ground pipeline, a three-way valve and a pressure sensor; the hydro pump is connected with the high-pressure pipeline through the ground pipeline; the pipeline stop valve, the pressure gauge and the pressure sensor are disposed on the ground pipeline; the pressure gauge is connected with the ground pipeline through the three-way valve; and the pressure sensor is connected with the data monitoring and collecting instrument.

An in-situ stress measurement method for non-vertical drilling is implemented in the above in-situ stress measurement device, and the in-situ stress measurement method includes the following steps:

before the quantitative value test, making the split-type axial-force-free circuit switching valve in the first state, and then pushing the bidirectional rolling device, the split-type axial-force-free circuit switching valve, the packer to a pre-selected hole depth in the drilled hole by the high-pressure pipeline;

subsequently, making the hydro pump work to pump water into the high-pressure pipeline, thereby making the water sequentially pass through the waterway channel of the central shaft of the bidirectional rolling device, the first waterway channel of the split-type axial-force-free circuit switching valve, the upper packer and the lower packer; and continuing to pump the water until the upper packer and the lower packer expand to form a sealing space, and then turning off the hydro pump and the pipeline stop valve;

dragging the high-pressure pipeline out of the drilled hole to make the split-type axial-force-free circuit switching valve in the second state; at this time, the high-pressure pipeline being connected with the water outlet of the fracture section steel pipe through the second waterway channel; and performing the quantitative value test of a hydraulic fracturing method according to in-situ stress measurement programs of the hydraulic fracturing method;

pushing the high-pressure pipeline into the drilled hole to make the split-type axial-force-free circuit switching valve in the first state, and turning on the pipeline stop valve to make the water from the pipeline, the upper packer and the lower packer flow out and unseal the packer; pushing, driven by the pipeline, the in-hole equipment to a next pre-selected hole depth in the drilled hole; and performing a next section test until the quantitative value test is completed; and during the impression test, disassembling the split-type axial-force-free circuit switching valve and the packer, and connecting the impression machine with the bidirectional rolling device; pushing the bidirectional rolling device and the impression machine into a hole depth of the impression test through the high-pressure pipeline, connecting the ground test equipment to pump water into the high-pressure pipeline, and performing the impression test; after the impression test, obtaining fracture data by depressurizing and taking out the impression machine, thereby completing in-situ stress measurement.

Based on the requirement of the in-situ stress measurement for ultra-deep non-vertical drilling and aiming at the shortcomings of current double-pipeline measurement, the disclosure adopts the axial-force-free circuit switching valve and the bidirectional rolling device, so as to realize an efficient single-pipeline measurement technology. The device and method have the following innovations and gains.

1. The split-type axial-force-free circuit switching valve eliminates the reverse thrust of the shaft in the sealing process, realizes the basic functions of integrating double high-pressure pipelines and switching pipelines, and makes the sealing of non-vertical ultra-deep drilling successful.

2. Based on the movement characteristics and use environment during the installation, test and recovery of test equipment, the bidirectional rolling device realizes pure rolling friction when the in-hole equipment moves relative to the hole wall through innovative structural design.

3. The single pipeline measurement for ultra-deep drilling reduces the number of equipment for double-pipeline measurement, improves the measurement efficiency and reduces the risk of measurement equipment loss.

4. The friction between the in-hole equipment and the hole wall during installation and withdrawal of the in-hole equipment is reduced, the friction loss of the in-hole equipment is effectively protected, the makings of the impression test are effectively protected, and the test reliability is improved.

Figure 1:
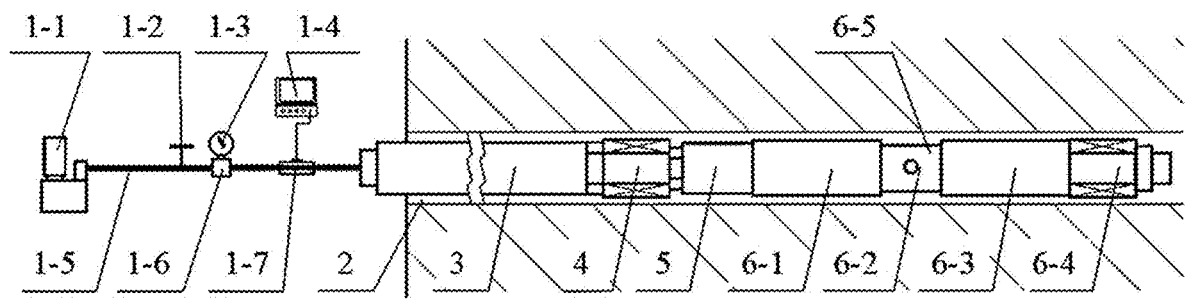
FIG. 1 illustrates a schematic diagram of a single-pipeline pure rolling in-situ stress measurement device for ultra-deep non-vertical drilling in a quantitative value test of the disclosure.
Figure 2:
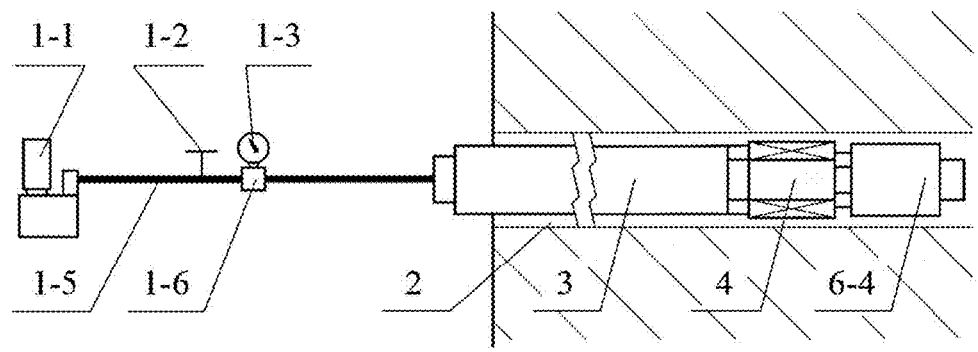
FIG. 2 illustrates a schematic diagram of a single-pipeline pure rolling in-situ stress measurement device for ultra-deep non-vertical drilling in an impression test of the disclosure.

DESCRIPTION OF REFERENCE NUMERALS 1-1: hydro pump, 1-2: pipeline stop valve, 1-3: pressure gage, 1-4: data monitoring and collecting instrument, 1-5: ground pipeline, 1-6: three-way valve, 1-7: pressure sensor, 2: drilled hole, 3: high-pressure pipeline, 4: bidirectional rolling device, 4-1: central shaft, 4-2: outer ring, 4-3: drum-shaped ball, 4-4: connecting thread, 4-5: retaining ring, 4-6: support frame, 4-7: roller, 5: split-type axial-force-free circuit switching valve, 5-1: valve shaft, 5-2: limit nut, 5-3: first valve body, 5-4: second valve body, 5-5: sealing ring, 5-6: drain hole, 5-7: second waterway channel, 5-8: pressure partition, 5-9: first waterway channel, 5-10: lower connecting port, 6-1: upper packer, 6-2: water outlet, 6-3: lower packer, 6-4: impression machine, 6-5: fracture section steel pipe.

DETAILED DESCRIPTION OF EMBODIMENTS

In order to make the purposes, technical schemes and advantages of the embodiments of the disclosure clearer, the technical schemes in the embodiments of the disclosure will be described clearly and completely with the attached drawings. Apparently, the described embodiments are some of the embodiments of the disclosure, but not all embodiments. The components of the embodiments of the disclosure generally described and illustrated in the drawings herein can be arranged and designed in various different configurations.

Referring to FIGS. 1-5, an embodiment of the disclosure provides an in-situ stress measurement device for ultra-deep non-vertical drilling, which includes ground test equipment, a high-pressure pipeline 3 and in-hole equipment.

The ground test equipment includes: a hydro pump 1-1, a pipeline stop valve 1-2, a pressure gauge 1-3, a data monitoring and collecting instrument 1-4, a ground pipeline 1-5, a three-way valve 1-6 and a pressure sensor 1-7. The hydro pump 1-1 is connected with the high-pressure pipeline 3 through the ground pipeline 1-5 to provide water needed for test. The pipeline stop valve 1-2, the pressure gauge 1-3 and the pressure sensor 1-7 are disposed on the ground pipeline 1-5, the pressure gauge 1-3 is connected with the ground pipeline 1-5 through the three-way valve 1-6, and the pressure sensor 1-7 is connected with the data monitoring and collecting instrument 1-4.

The in-hole equipment includes a bidirectional rolling device 4, a split-type axial-force-free circuit switching valve 5, a packer and an impression machine 6-4. The bidirectional rolling device 4 is in threaded connection with the high-pressure pipeline 3, the packer includes an upper packer 6-1, a fracture section steel pipe 6-5 and a lower packer 6-3 which are sequentially in threaded connection in that order, and the fracturing section steel pipe 6-5 defines a water outlet 6-2. During a quantitative value test, the in-hole equipment uses the bidirectional rolling device 4, the split-type axial-force-free circuit switching valve 5 and the packer. During an impression test, the in-hole equipment uses the bidirectional rolling device 4 and the impression machine 6-4.

The split-type axial-force-free circuit switching valve 5 define a first waterway channel 5-9 and a second waterway channel 5-7. The first waterway channel 5-9 is connected with the upper packer 6-1 and the lower packer 6-3 to form a double packer structure, and the second waterway channel 5-7 is connected with the water outlet 6-2 of the fracture section steel pipe 6-5 through a central rod of the upper packer 6-1.

Figure 3A:
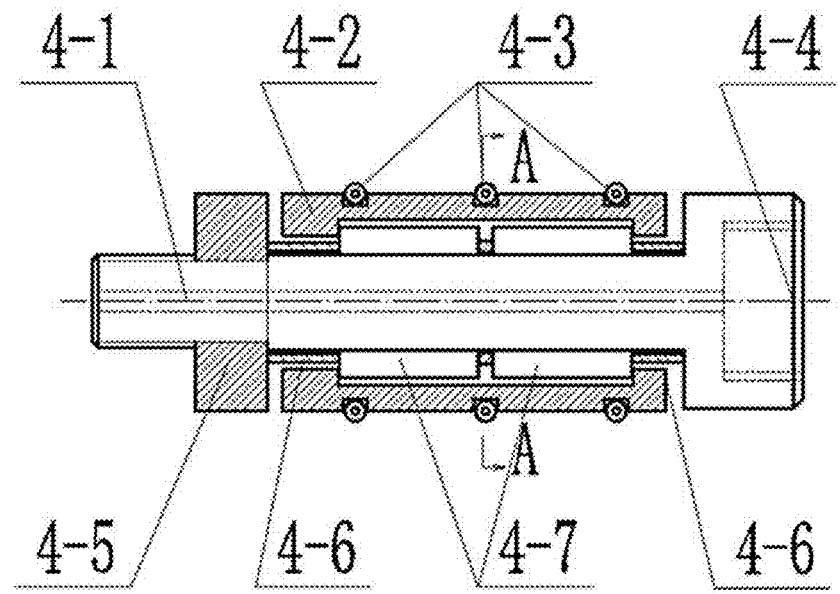
FIG. 3A illustrates a transverse sectional view of a bidirectional rolling device in an embodiment of the disclosure.
Figure 3B:
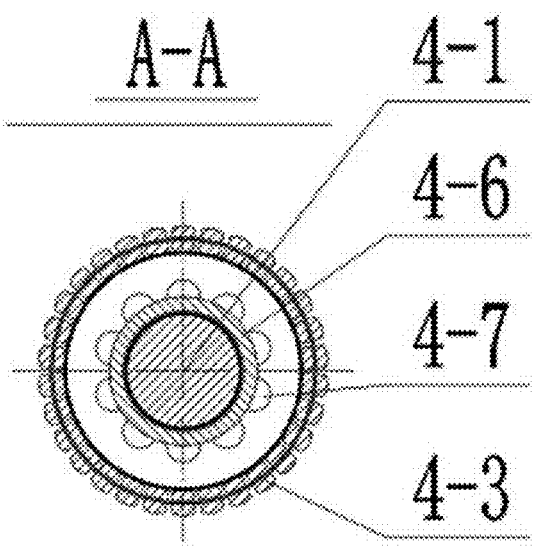
FIG. 3B illustrates a longitudinal sectional view of the bidirectional rolling device in the embodiment of the disclosure.

As illustrated in FIG. 3A and FIG. 3B, the bidirectional rolling device 4 includes: a central shaft 4-1, an outer ring 4-2, drum-shaped balls 4-3, connecting threads 4-4, a retaining ring 4-5, a support frame 4-6 and rollers 4-7. The central shaft 4-1 defines a waterway channel therein, and a top and a bottom of the central shaft 4-1 are threadedly connected with the high-pressure pipeline 3 and the split-type axial-force-free circuit switching valve 5, respectively. An outer side of the central shaft 4-1 is provided with the support frame 4-6, and the support frame 4-6 is provided with the rollers 4-7 thereon. The support frame 4-6 and the rollers 4-7 form an inner ring of a bearing structure, and an outer side of the inner ring is the outer ring 4-2, and an outer surface of the outer ring 4-2 is provided with the drum-shaped balls 4-3 thereon. The retaining ring 4-5 is provided on two sides of the inner and outer rings along a axial direction to limit the inner ring and the outer ring 4-2.

As illustrated in FIG. 4A to FIG. 5B, the split-type axial-force-free circuit switching valve 5 includes: a valve shaft 5-1, a limit nut 5-2, a first valve body 5-3, a second valve body 5-4, sealing rings 5-5, a drain hole 5-6, a second waterway channel 5-7, a pressure partition 5-8, a first waterway channel 5-9 and a lower connecting port 5-10. The first valve body 5-3, the second valve body 5-4 and the valve shaft 5-1 are the main structures of the split-type axial-force-free circuit switching valve 5. The second valve body 5-4 is in threaded connection with the first valve body 5-3, and only by this split arrangement, the valve shaft 5-1 can be installed. In this valve, three groups of sealing rings 5-5 are disposed in the second valve body 5-4, and a waterway is defined between every two adjacent groups of sealing rings 5-5, one waterway is communicated with the first waterway channel 5-9 and the other waterway is communicated with the second waterway channel 5-7. When the valve shaft 5-1 slides in the second valve body 5-4, the internal waterway of the valve shaft 5-1 and the two waterways defined between the sealing rings 5-5 are in a connected state or a disconnected state, thereby achieving communication between the internal waterway of the valve shaft 5-1 and the first waterway channel 5-9 or the internal waterway of the valve shaft 5-1 and the second waterway channel 5-7.

Figure 4A:
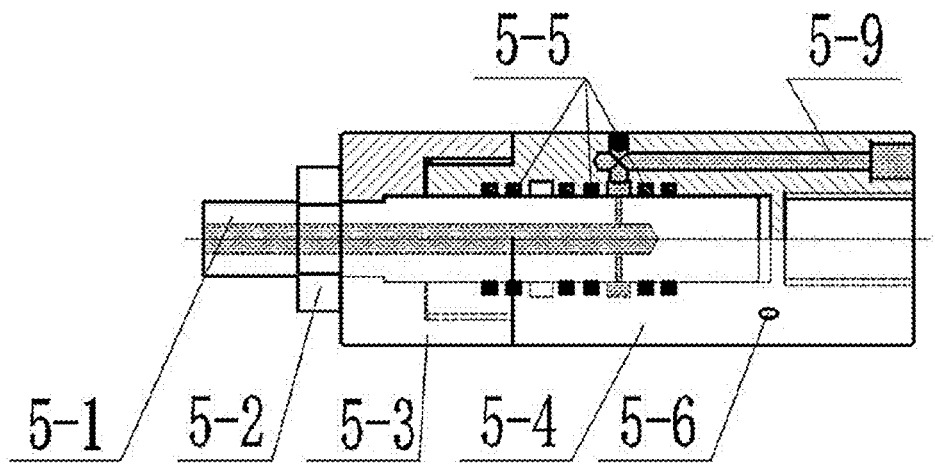
FIG. 4A illustrates a transverse sectional view of a split-type axial-force-free circuit switching valve connected to a first waterway channel in a first state of the disclosure.
Figure 4B:
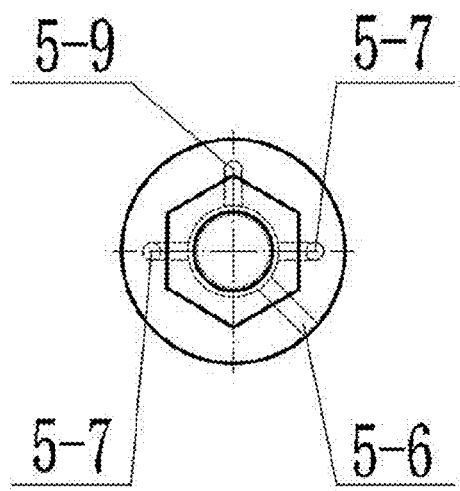
FIG. 4B illustrates a longitudinal sectional view of the split-type axial-force-free circuit switching valve connected to the first waterway channel in the first state of the disclosure.
Figure 5A:
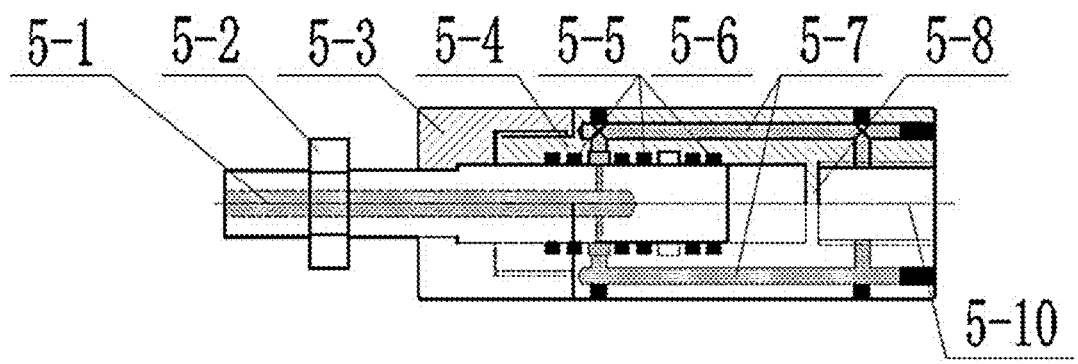
FIG. 5A illustrates a transverse sectional view of a split-type axial-force-free circuit switching valve connected to a second waterway channel in a second state of the disclosure.
Figure 5B:
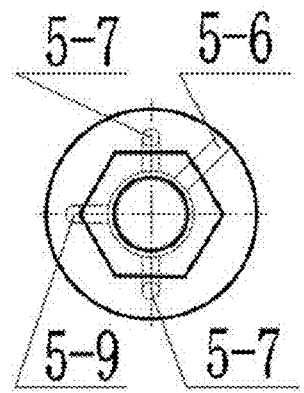
FIG. 5B illustrates a longitudinal sectional view of the split-type axial-force-free circuit switching valve connected to the second waterway channel in the second state of the disclosure.

As illustrated in FIG. 4A and FIG. 4B, when the in-hole equipment is pushed into the drilled hole through the high-pressure pipeline 3, due to the initial state and the friction of the hole wall, the split-type axial-force-free circuit switching valve 5 is in a first state. At this time, the internal waterway of the valve shaft 5-1 communicates with (i.e., is connected with) the first waterway channel 5-9, and then communicates with the upper packer 6-1 and the lower packer 6-3. At this time, pressurizing, the upper packer 6-1 and the lower packer 6-3 expand and seal on the hole wall, and a drill pipe is dragged out of the drilled hole to drive the valve shaft 5-1 to move out of the drilled hole, forming the second state as illustrated in FIGS. 5A and 5B. At this time, the internal waterway of the valve shaft 5-1 communicates with the second waterway channel 5-7, and then communicates with the water outlet 6-2 of the fracture section steel pipe 6-5.

The valve shaft 5-1 is matched with the connecting threads 4-4 of the central shaft 4-1 of the bidirectional rolling device 4. The valve shaft 5-1 is equipped with the limit nut 5-2 to limit the movement of the valve shaft 5-1 in the first state.

The second valve body 5-4 defines a drain hole 5-6 to communicate with the inside and outside of the second valve body 5-4. This design is used to eliminate the pressure in the cavity of the second valve body 5-4 when the valve shaft 5-1 changes from the second state to the first state.

The second valve body 5-4 is provided with the pressure partition 5-8 to isolate the communication between the second waterway channel 5-7 and the valve shaft 5-1. This design eliminates the pressure of the second waterway channel 5-7 on the bottom of the valve shaft 5-1 during the test.

The split-type axial-force-free circuit switching valve 5 is threadedly connected with the packer through the lower connecting port 1-10.

An embodiment of the disclosure further provides an in-situ stress measurement method for ultra-deep non-vertical drilling, which adopts the in-situ stress measurement device for ultra-deep non-vertical drilling, and the method includes the following steps.

Before the quantitative value test, the split-type axial-force-free circuit switching valve is in the first state, and then the in-hole equipment (i.e., the bidirectional rolling device 4, the split-type axial-force-free circuit switching valve 5, the packer) is pushed to a pre-selected hole depth in the drilled hole by the high-pressure pipeline 3.

Subsequently, the hydro pump 1-1 works (i.e., is turned on) to pump water into the high-pressure pipeline 3. The water sequentially passes through the high-pressure pipeline 3, the internal waterway of the central shaft 4-1 of the bidirectional rolling device 4, the first waterway channel 5-9 of the split-type axial-force-free circuit switching valve 5, the upper packer 6-1 and the lower packer 6-3 in that order. Continuing to pump the water until the upper packer 6-1 and the lower packer 6-2 expand to form a sealing space, then the hydro pump 1-1 and the pipeline stop valve 1 are turned off.

The high-pressure pipeline 3 is dragged out of the drilled hole, so that the split-type axial-force-free circuit switching valve 5 is in the second state. At this time, the high-pressure pipeline 3 is communicated with the water outlet 6-2 of the fracture section steel pipe 6-5 through the second waterway channel 5-7, and the quantitative value test of the in-situ stress value measurement of the hydraulic fracturing method is carried out according to in-situ stress measurement programs of the hydraulic fracturing method.

The high-pressure pipeline 3 is pushed into the drilled hole, so that the split-type axial-force-free circuit switching valve 5 is in the first state, the pipeline stop valve 1-2 is turned on, and the water from the high-pressure pipeline 3, the upper packer 6-1 and the lower packer 6-3 flows out, and the packer is unsealed, and the in-hole equipment is pushed through the high-pressure pipeline 3 to a next pre-selected hole depth in the drilled hole, and the next section of the test is carried out until the quantitative value test is completed.

During the impression test, the split-type axial-force-free circuit switching valve 5 and the packer are disassembled, and the impression machine 6-4 is connected with the bidirectional rolling device 4. If necessary, two bidirectional rolling devices 4 can be connected at front and back of the impression machine 6-4, and the in-hole equipment (i.e., the bidirectional rolling device 4 and the impression machine 6-4) is pushed into a hole depth of the impression test through the high-pressure pipeline 3, the ground test equipment is connected, the high-pressure water is pumped into the high-pressure pipeline 3, and the impression test is carried out. After the test, the fracture data can be obtained by depressurizing and taking out the impression machine 6-4. Because that a diameter of the impression machine 6-4 in the unpressurized state is small than that of the bidirectional rolling device 4, the markings on the surface of the impression machine 6-4 can be effectively protect. At this point, the in-situ stress measurement is completed.

The main innovation of the disclosure is to change the current double high-pressure pipeline loop test into a single pipeline loop test, thereby reducing the number of equipment, improving the test efficiency, reducing the risk of loss of test equipment, and being suitable for non-vertical deep drilling test. The above functions are mainly realized by the split-type axial-force-free circuit switching valve and the bidirectional rolling device.

The split-type axial-force-free circuit switching valve adopts the structure of split, three pairs (i.e., three groups) of sealing rings and the pressure partition, etc. Through the above structure, the valve eliminates the reverse thrust of the shaft in the sealing process, realizes the basic functions of integrating double high-pressure pipelines and switching pipelines, and makes the sealing of non-vertical drilling successful. The bidirectional rolling device fully considers the movement characteristics and use environment of the test equipment during installation, test and recovery, and changes the axial movement and circumferential rotation of the in-hole equipment from sliding friction to rolling friction. The axial sliding in the drilled hole is borne by single row or multiple rows of drum-shaped balls 4-3 embedded in the outer ring of the needle bearing, and the circumferential rotation is borne by the relative movement of the inner and outer rings of the needle bearing. The bidirectional rolling of this device is undertaken by the cylindrical roller bearing and the drum-shaped balls 4-3, and the needle bearing and the drum-shaped balls 4-3 are in line contact with the hole wall, which can bear the weight of the in-hole equipment and part of the drill pipe and ensure the rolling flexibility on the basis of saving radial dimensions.

The above is only the specific embodiment of the disclosure, but the protection scope of the disclosure is not limited to this, and any changes or substitutions that can be easily thought of by those skilled in the art within the technical scope disclosed by the disclosure should be included in the protection scope of the disclosure. Therefore, the scope of protection of the disclosure should be based on the scope of protection of the claims.

What is claimed is:

1. An in-situ stress measurement device for non-vertical drilling, comprising: ground test equipment, a pipeline, and in-hole equipment; wherein the ground test equipment is configured to provide water to the in-hole equipment through the pipeline;

wherein the in-hole equipment comprises: a bidirectional rolling device, a split-type axial-force-free circuit switching valve, a packer and an impression machine; the bidirectional rolling device is detachably connected with the pipeline, and axial movement and circumferential rotation of the bidirectional rolling device relative to a drilled hole are rolling friction;

wherein the packer comprises: an upper packer, a fracture section steel pipe and a lower packer which are sequentially detachably connected in that order, and the fracture section steel pipe defines a water outlet;

wherein the split-type axial-force-free circuit switching valve defines a first waterway channel and a second waterway channel; the split-type axial-force-free circuit switching valve is capable of switching between a first state and a second state under a driving action of the pipeline; in the first state, an internal waterway of the split-type axial-force-free circuit switching valve is connected with the upper packer and the lower packer through the first waterway channel to form a double-packer structure; and in the second state, the internal waterway of the split-type axial-force-free circuit switching valve is connected with the water outlet of the fracture section steel pipe through the second waterway channel and a central rod of the upper packer; and wherein the in-hole equipment is configured to use the bidirectional rolling device, the split-type axial-force-free circuit switching valve, and the packer which are sequentially connected in that order in a quantitative value test, and use the bidirectional rolling device and the impression machine which are sequentially connected in that order in an impression test.

2. The in-situ stress measurement device as claimed in claim 1, wherein the bidirectional rolling device is in threaded connection with the pipeline; and the upper packer, the fracture section steel pipe and the lower packer are sequentially in threaded connection in that order.

3. The in-situ stress measurement device as claimed in claim 1, wherein the bidirectional rolling device comprises: a central shaft, an outer ring, drum-shaped balls, a retaining ring, a support frame and rollers; the central shaft defines a waterway channel therein; a top and a bottom of the central shaft are threadedly connected with the pipeline and the split-type axial-force-free circuit switching valve, respectively; an outer side of the central shaft is provided with the support frame, the support frame is provided with the rollers thereon, and the support frame and the rollers form an inner ring of a bearing structure; an outer side of the inner ring is provided with the outer ring, and an outer surface of the outer ring is provided with the drum-shaped balls thereon; the retaining ring is provided at two sides of the inner and outer rings along an axial direction to limit the inner and outer rings; and axial sliding in the drilled hole is borne by the drum-shaped balls, and circumferential rotation in the drilled hole is borne by a relative movement of the inner and outer rings.

4. The in-situ stress measurement device as claimed in claim 1, wherein the split-type axial-force-free circuit switching valve comprises: a valve shaft, a limit nut, a first valve body, a second valve body, and three groups of sealing rings; the second valve body is in threaded connection with the first valve body, and the three groups of sealing rings are disposed in the second valve body; two waterways are defined among the three groups of sealing rings, one of the two waterways is defined between two adjacent groups of the three groups of sealing rings, and the other waterway is defined between other two adjacent groups of the three groups of sealing rings; the one waterway is connected with the first waterway channel, and the other waterway is connected with the second waterway channel; and when the valve shaft slides in the second valve body driven by the pipeline, an internal waterway of the valve shaft and the two waterways are in one of a connected state and a disconnected state, thereby achieving connection with the first waterway channel or the second waterway channel.

5. The in-situ stress measurement device as claimed in claim 4, wherein the second valve body defines a drain hole configured to connect an inside and an outside of the second valve body and eliminate a cavity pressure of the second valve body when the valve shaft changes from the second state to the first state.

6. The in-situ stress measurement device as claimed in claim 4, wherein a pressure partition is provided in the second valve body, the pressure partition is configured to isolate connection between the second waterway channel and the valve shaft, so as to eliminate a pressure of the second waterway channel on a bottom of the valve shaft during test.

7. The in-situ stress measurement device as claimed in claim 1, wherein the ground test equipment comprises: a hydro pump, a pipeline stop valve, a pressure gauge, a data monitoring and collecting instrument, a ground pipeline, a three-way valve and a pressure sensor; the hydro pump is connected with the pipeline through the ground pipeline; the pipeline stop valve, the pressure gauge and the pressure sensor are disposed on the ground pipeline; the pressure gauge is connected with the ground pipeline through the three-way valve; and the pressure sensor is connected with the data monitoring and collecting instrument.

8. An in-situ stress measurement method for non-vertical drilling, implemented in the in-situ stress measurement device for non-vertical drilling as claimed in claim 1, and comprising:

before the quantitative value test, making the split-type axial-force-free circuit switching valve in the first state, and then pushing the bidirectional rolling device, the split-type axial-force-free circuit switching valve, the packer to a pre-selected hole depth in a drilled hole by the pipeline;

making a hydro pump work to pump water into the pipeline, thereby making the water sequentially pass through an waterway channel of a central shaft of the bidirectional rolling device, the first waterway channel of the split-type axial-force-free circuit switching valve, the upper packer and the lower packer; and continuing to pump the water until the upper packer and the lower packer expand to form a sealing space, and then turning off the hydro pump and a pipeline stop valve;

dragging the pipeline out of the drilled hole to make the split-type axial-force-free circuit switching valve in the second state; at this time, the pipeline being connected with the water outlet of the fracture section steel pipe through the second waterway channel; and performing the quantitative value test of a hydraulic fracturing method according to in-situ stress measurement programs of the hydraulic fracturing method;

pushing the pipeline into the drilled hole to make the split-type axial-force-free circuit switching valve in the first state, and turning on the pipeline stop valve to make the water from the pipeline, the upper packer and the lower packer flow out and unseal the packer; pushing, driven by the pipeline, the in-hole equipment to a next pre-selected hole depth in the drilled hole; and performing a next section test until the quantitative value test is completed; and during the impression test, disassembling the split-type axial-force-free circuit switching valve and the packer, and connecting the impression machine with the bidirectional rolling device; pushing the bidirectional rolling device and the impression machine into a hole depth of the impression test through the pipeline, connecting the ground test equipment to pump water into the pipeline, and performing the impression test; after the impression test, obtaining fracture data by depressurizing and taking out the impression machine, thereby completing in-situ stress measurement.

* * * * *